Sept. 26, 1967   L. H. GILLICK ETAL   3,343,473
AIR DISTRIBUTION SYSTEM
Filed Sept. 7, 1965   5 Sheets-Sheet 1
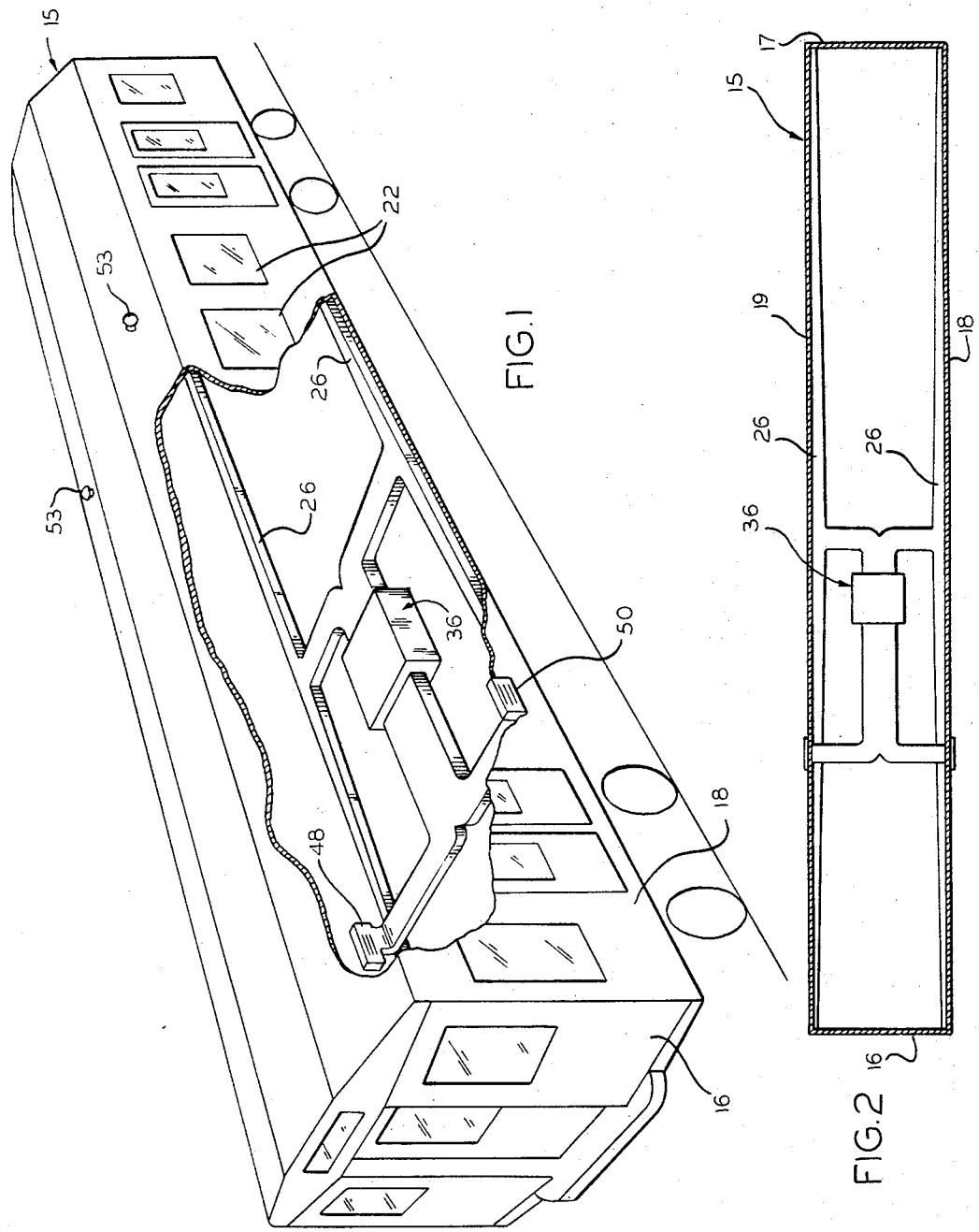
INVENTORS
LAURANCE H. GILLICK
ALEXANDER P. STIKKERS
BY
ATTORNEY

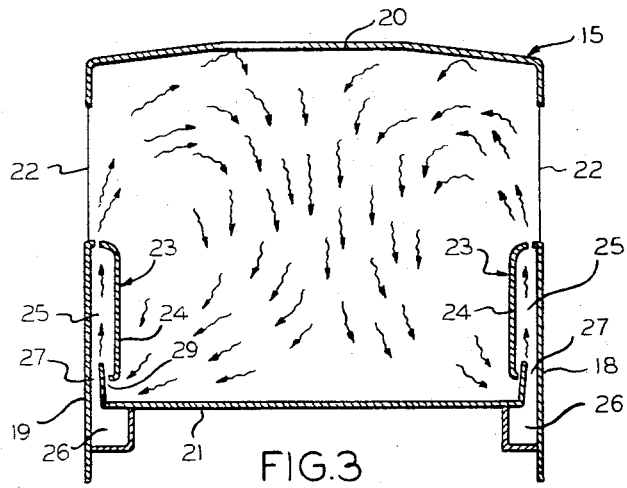
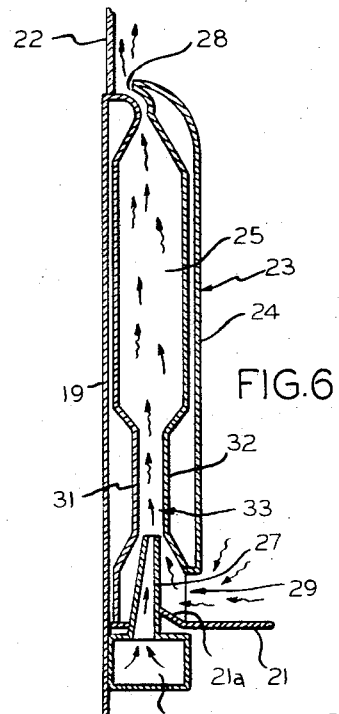
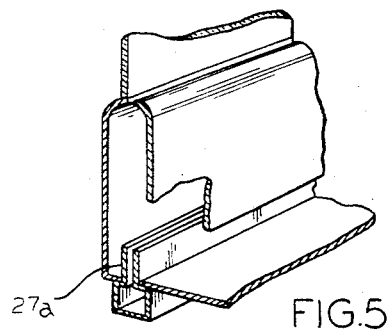
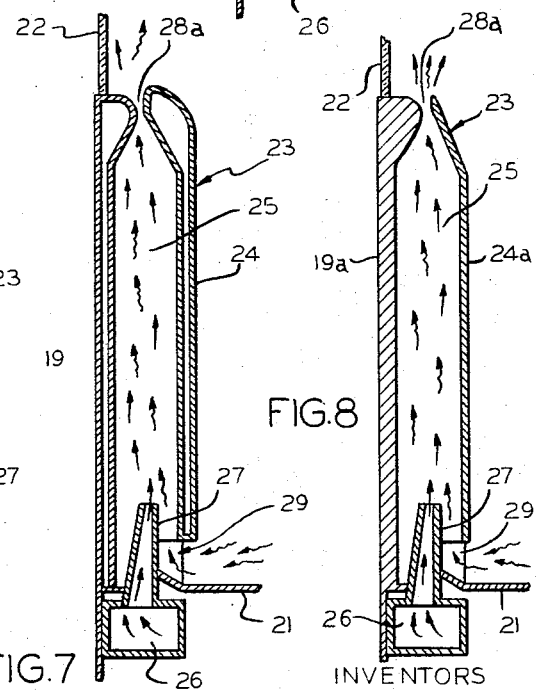
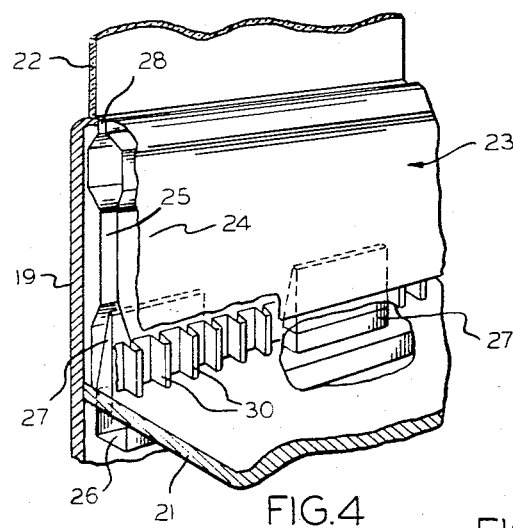
INVENTORS
LAURANCE H. GILLICK
ALEXANDER P. STIKKERS
ATTORNEY Sept. 26, 1967    L. H. GILLICK ETAL    3,343,473
AIR DISTRIBUTION SYSTEM
Filed Sept. 7, 1965    5 Sheets-Sheet 3
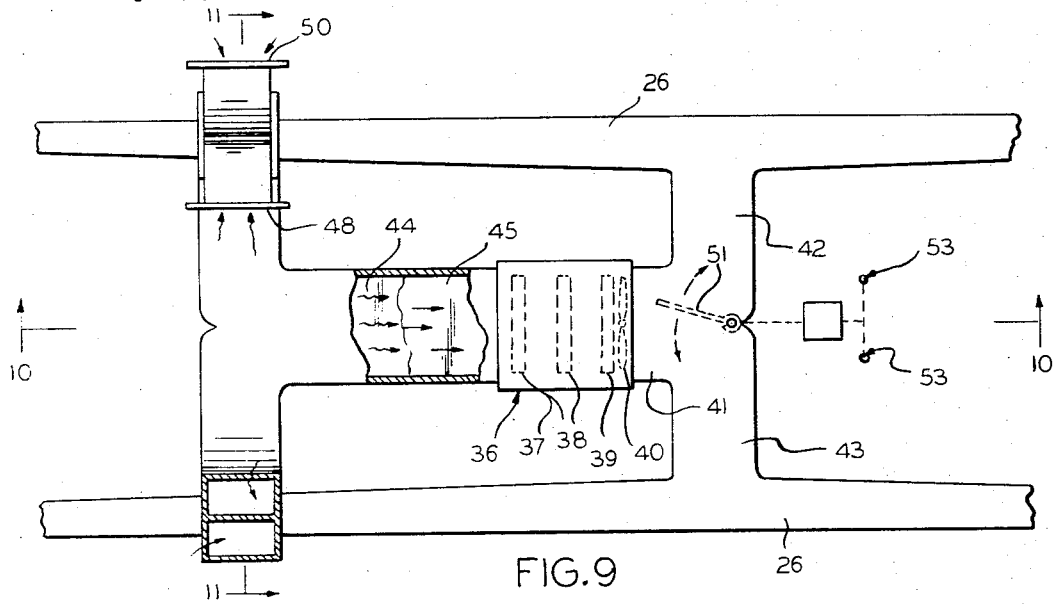
FIG. 9
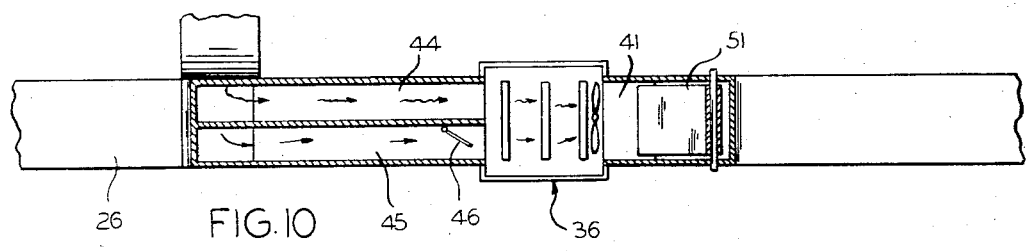
FIG. 10
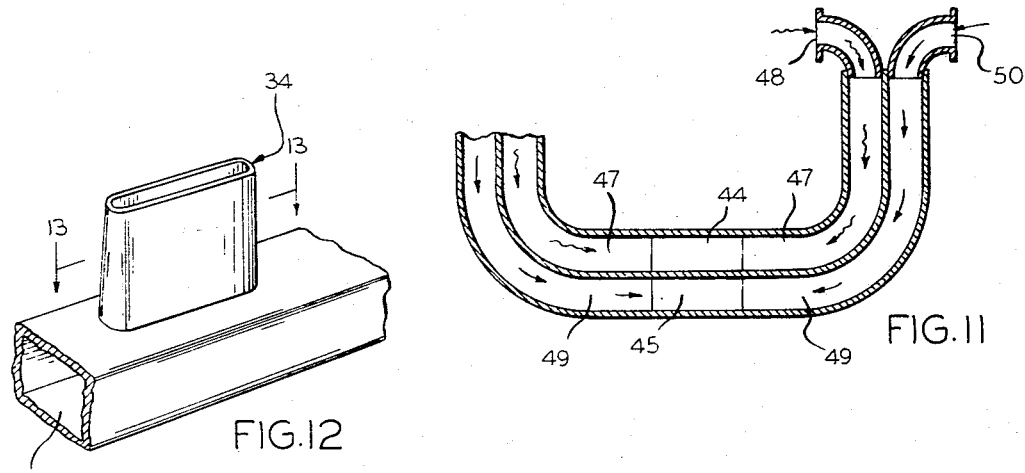
FIG. 11
FIG. 12
FIG. 13
INVENTORS
LAURANCE H. GILLICK
ALEXANDER P. STIKKERS
BY
ATTORNEY

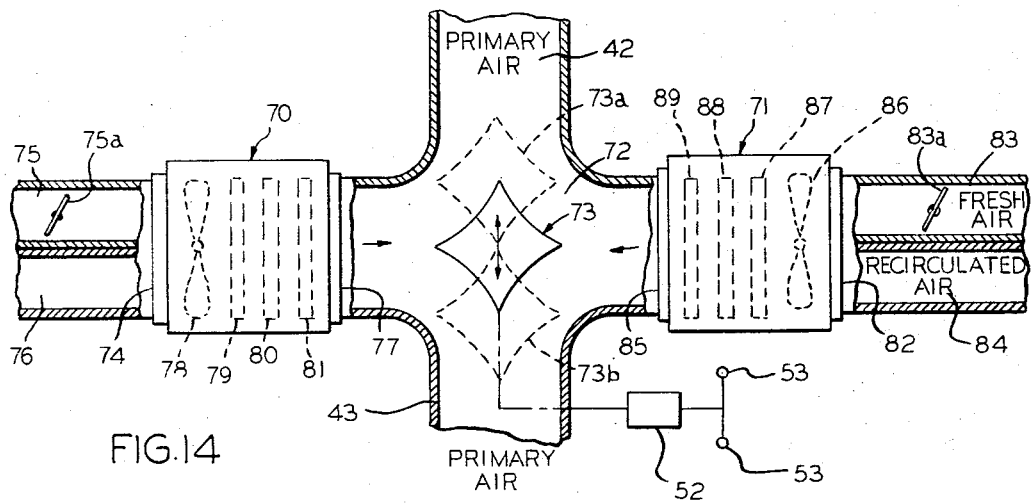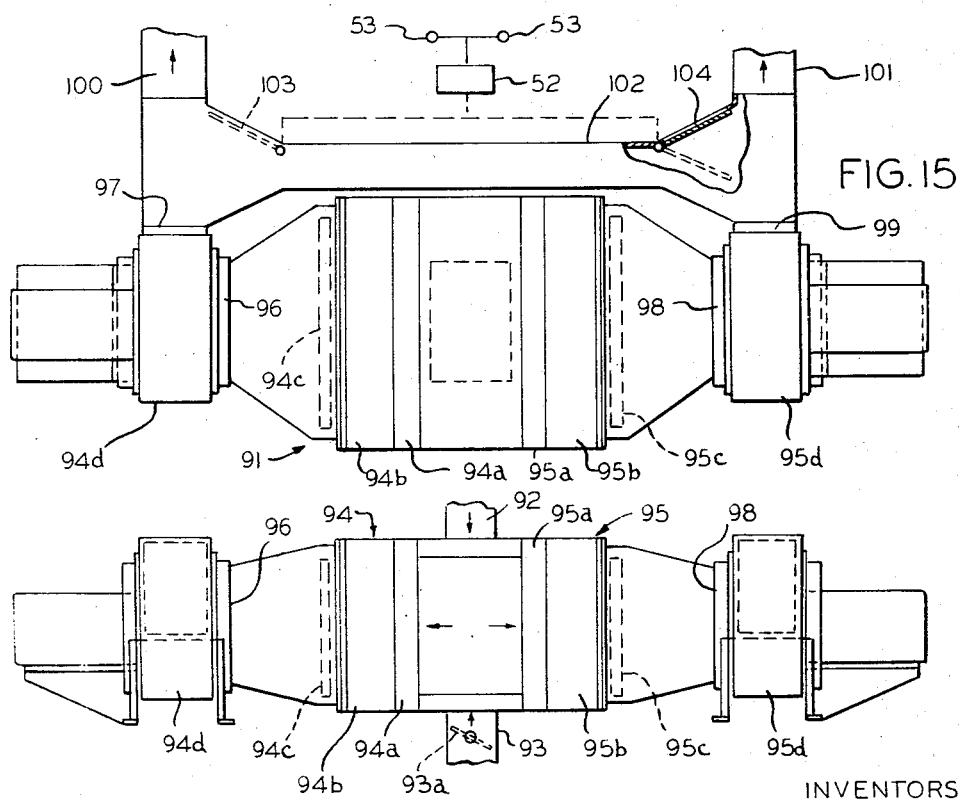

Sept. 26, 1967     L. H. GILLICK ETAL     3,343,473
AIR DISTRIBUTION SYSTEM
Filed Sept. 7, 1965                5 Sheets-Sheet 5

INVENTORS
LAURANCE H. GILLICK
ALEXANDER P. STIKKERS
BY Norman A. Witt

ATTORNEY and against drafts, wherein each passenger feels the comfort of live, fresh temperature effectiveness.

3,343,473
AIR DISTRIBUTION SYSTEM

Laurance H. Gillick, Wilmette, and Alexander P. Stikkers, Elgin, Ill., assignors to Vapor Corporation, Chicago, Ill., a corporation of Delaware
Filed Sept. 7, 1965, Ser. No. 485,383
15 Claims. (Cl. 98—10)

ABSTRACT OF THE DISCLOSURE

Vehicle air conditioning and distribution system having a unit mounted below the floor delivering primary air to nozzles within the vehicle for mixing with recirculated air induced by the nozzles, and also including control means for controlling the distribution of air to opposite sides of the vehicle to compensate for temperature variation therebetween.

---

This invention relates in general to an air distribution system for passenger vehicles, either aircraft or cars of the type employed by municipalities for transporting passengers by rail, such as by surface or subway car, and more particularly to an air conditioning and distribution system capable of providing complete passenger comfort in such a transportation vehicle, and still more particularly to an air conditioning and distribution system for providing uniform distribution of air at a uniform temperature throughout a vehicle, although other uses and purposes of the invention may be apparent to one skilled in the art.

The air conditioning and distribution system of the present invention is capable of providing in a transportation vehicle a complete envelope of air movement around each passenger that effectively surrounds the passenger with a fresh, live feeling much like a calm, comfortable spring or summer day without creating undesirable drafts. The distribution of air is so uniform throughout the full length of a vehicle that even the temperature of the air adjacent the entire floor and ceiling is substantially the same. While the system of the present invention is equally applicable for heating and cooling cycles, it permits cooling the primary air to a point where humidity is effectively controlled by air movement over the evaporator and this air is delivered into a radiant space where it picks up and blends with car air so that the discharge temperature during the cooling cycle at the discharge openings along the length of the vehicle is never more than 15° F. below vehicle thermostat setting whereby the delivered air is never at an uncomfortable temperature.

For cooling purposes, the present invention is capable of matching the evaporator or heat exchange cooling means air flow requirement to the passenger space air flow requirement so that optimum conditions exist for both passenger and evaporator. To provide comfort for a passenger, twice the air movement is needed than that which would provide proper operation of an evaporator to remove water from the air. For if the air movement over the evaporator is too great, humidity problems will prevail which will cause discomfort to passengers. Thus, the system of the present invention permits the use of a lower air movement over the evaporator while at the same time creating double the air movement for passenger comfort. The increased volume of air movement, averaging about twice what is normally provided in a vehicle, is introduced in a thin film over the entire warm surface of the vehicle (during cooling cycle) so that the air further mixes with the vehicle air before impinging on a passenger. Continuous recirculation of air throughout a vehicle, together with the concept of air circulation and air blending insures against dead or quiet spots or spots with uncontrolled temperature, and against drafts, wherein each passenger feels the comfort of live, fresh temperature effectiveness.

In the air distribution system of the present invention, a wall structure is employed along each of the side walls of a vehicle between the floor and the lower edges of the windows, wherein an air chamber is defined within and along the wall structure. A discharge opening is placed at the upper end of the air chamber along the lower edges of the windows for discharging air upwardly along the windows and toward the ceiling of the vehicle, wherein the air from the opposite wall structures moves along the ceiling toward the center of the vehicle and then gravitationally downwardly. A recirculating air opening is provided along the lower ends of each of the wall structures to permit recirculating air to be taken into the air chamber. A duct is mounted below the floor at each side of the car and beneath the wall structure at each side for receiving and supplying primary air to the air chamber of the wall structures. Nozzle means are mounted along the duct and which extend upwardly and into the air chamber for discharging the primary air into the air chamber. The nozzle means coact with the air chamber to induce movement of air within the vehicle and to cause recirculating air to enter the recirculating air openings and move upwardly through the air chamber to mix with the primary air and thereafter be discharged through the upper discharge openings. Thus, the primary air is tempered by the recirculating air before being discharged into the vehicle. The size of the discharge and recirculating air openings and the nozzle means are such as to coact with the velocity of the air being discharged from the nozzle means to define an induction ratio of primary air to recirculated air of about one to one, and to cause the air emitted from the discharge openings to travel upwardly along the windows toward the ceiling of the vehicle and to thereafter be moved toward the center of the car and be dispersed before falling downwardly toward the floor. Moreover, the size of the recirculating air openings is such as to preclude noticeable drafts along the floor caused by air movement into the recirculating air openings and to prevent dirt from moving into the openings to be redistributed throughout the vehicle. While passengers will feel air movement, they will not experience annoying drafts. Further, it should be appreciated that a radiant effect is given to the car by the temperature of the side wall panel and of the window glass to provide a close relationship to the car temperature and additional comfort that is independent of outside, ambient temperatures. By combining recirculating air with primary air, the system of the present invention permits the utilization of smaller size primary air ducts since a smaller amount of primary air is needed, and further permits working with a lower temperature of primary air to give better dehumidification, and still further permits the discharge of a higher temperature of air within a vehicle to provide better passenger comfort.

Primary air in this specification is intended to mean air that may be conditioned, either heated or cooled, and/or fresh air taken from the outside of the vehicle, all of which is expelled through the nozzles into the air chambers of the wall structures. Recirculated air is that air that is taken from within the vehicle and passed through the air chambers by induction and mixed with the primary air and ultimately redistributed throughout the vehicle. Return air is air that is taken from the car body through return air openings and mixes with outside fresh air to make up the required quantity of primary air.

In order to provide the primary air, any type of equipment may be employed, but another feature of the invention involves the use of a centrally mounted box or housing arranged below the floor of the vehicle and in which is located a blower, cooling element, heating element, and cooling reheat element, filters, dampers, thermostats, contactors, relays and such other equipment as desired to provide whatever is necessary to give the comfort air conditioning desired within the vehicle. The air supplied to the central box is preferably provided through returns opening into the vehicle and fresh air inlets which open to the outside air, while the discharge of air from the central box is generally split between the ducts at the opposite sides of the vehicle. A damper may be provided to control the amount of fresh air desired to be employed in the central box, and a directional damper may be employed at the outlet of the box to direct any desired proportion of the discharge to one or the other of the ducts running along the sides of the vehicle.

Another feature of the invention involves the use of means for controlling the directional damper to compensate for the sun's radiant energy in directing more or less primary air to either of the ducts at opposite sides of the vehicle.

Another feature of the invention involves the use of a constant velocity nozzle to be employed within the air chamber which will compensate for the temperature of the air delivered through the nozzles so as to maintain the proper induction ratio.

It is therefore an object of the present invention to provide a new and improved air distribution system for passenger carrying transit vehicles or cars.

A further object of the present invention is to provide in a transportation vehicle a complete envelope of air movement around each passenger that effectively surrounds the passenger with a fresh, live feeling much like a calm, comfortable spring or summer day without creating undesirable drafts.

Another objects of this invention is in the provision of an air distribution system for a passenger carrying vehicle that is capable of providing uniform distribution of air throughout the vehicle at a uniform temperature to assure complete passenger comfort.

Still another object of the present invention resides in the provision of an air distribution system for passenger carrying vehicles that requires the minimum amount of space and equipment thereby lending itself to overall cost saving.

Another object of the present invention is in the provision of an air conditioning and distribution system for passenger carrying vehicles that is capable of efficiently and accurately providing temperature controlled ventilation, including heating and cooling, without subjecting the passengers to noticeable drafts or hot and cold spots.

A still further object of the present invention is to provide an air conditioning system for passenger carrying vehicles that includes a single and compact air conditioning housing to be mounted below the floor of a vehicle and which includes all of the controls and air conditioning elements necessary to provide primary air to ductwork that distributes the air throughout the interior of the vehicle.

A further object of this invention is in the provision of an air conditioning system for a passenger carrying vehicle including means for supplying a source of primary air and ductwork for distributing the air along opposite sides of the vehicle, and means for detecting the sun's radiant energy at either side of the car and for thereafter controlling the distribution of primary air to the ductwork at either side of the car in order to provide a more uniform temperature throughout the vehicle.

Still another object of this invention is to provide an air distribution system for passenger carrying vehicles including an air chamber at opposite sides of the vehicle into which is delivered primary air which induces air within the vehicle to be recirculated therethrough and mixed with the primary air before being discharged into the vehicle, and wherein nozzles are provided for delivering the primary air and which may have means for obtaining constant velocity so that the velocity will be adjusted depending upon the temperature of the air moving through the nozzles to maintain a proper induction ratio at various input velocity to the nozzles.

A further object of this invention is to provide on air distribution system that combines or blends primary and circulating air to permit employment of smaller size primary air ducts.

A still further object of this invention is in the provision of an air conditioning and distribution system capable of matching evaporator air flow requirements with passenger air flow requirements to permit efficient and proper dehumidification and to provide passenger comfort.

Other objects, features, and advantages of the invention will be apparent from the following detailed disclosure, taken in conjunction with the accompanying sheets of drawings, wherein like reference numerals refer to like parts, in which:

FIG. 1 is a perspective view of a passenger carrying vehicle with parts broken away to show the general arrangement of the air conditioning system according to the present invention, and particularly the arrangement of ductwork underneath the floor of the vehicle;

FIG. 2 is a longitudinal sectional view, somewhat diagrammatic, taken through the vehicle of FIG. 1 and again illustrating the general arrangement of the ductwork for the air conditioning system of the present invention;

FIG. 3 is a somewhat diagrammatic transverse sectional view taken through a vehicle having an air conditioning system in accordance with the present invention and illustrating primarily the flow of air through the interior of the vehicle;

FIG. 4 is a somewhat sectional and fragmentary diagrammatic view of a portion of the wall structure of a vehicle having the induction system accroding to one embodiment of the present invention;

FIG. 5 is a view similar to FIG. 4 showing another embodiment of the invention where a single nozzle is provided;

FIG. 6 is a detail cross-sectional view of one embodiment taken through one side of a vehicle and a wall structure according to the present invention and illustrating the movement of air through the air chamber defined by the wall construction;

FIG. 7 is a view similar to FIG. 6 but showing some variations in structure;

FIG. 8 is a view similar to FIG. 7 but illustrating the invention as associated with a single wall structure;

FIG. 9 is an enlarged somewhat diagrammatic view with parts broken away for clarity of a portion of the ductwork showing the movement of air therethrough and showing one form of an air conditioning unit;

FIG. 10 is a transverse sectional view taken generally along line 10—10 of FIG. 9;

FIG. 11 is a transverse sectional view taken generally along line 11—11 of FIG. 9;

FIG. 12 is an enlarged perspective view of a modified nozzle in accordance with the present invention;

FIG. 13 is a cross-sectional view taken substantially along line 13—13 of FIG. 12 and showing in solid and dotted lines the operation of the modified nozzle;

FIG. 14 is a diagrammatic view with some parts broken away of a modified air conditioning system to be employed for conditioning and distributing air throughout a vehicle;

FIG. 15 is a top plan view, somewhat diagrammatic with parts broken away, of a still further modified air conditioning and air distribution unit to be employed for a vehicle;

FIG. 16 is a front elevational view of the unit of FIG. 15;

Figure 17:
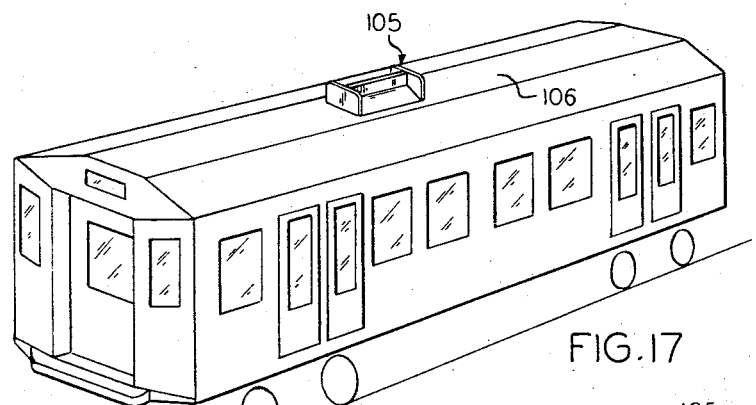
FIG. 17 is a somewhat diagrammatic view illustrating a modified temperature sensing device for controlling air distribution within a vehicle at opposite sides thereof.

Referring now to the drawings and particularly to FIGS. 1, 2 and 3, the present invention is preferably employed in a passenger carrying vehicle such as a rail vehicle 15 as shown in FIGS. 1 and 2. This vehicle is shown to illustrate the present invention and it should be appreciated that any suitable type of passenger vehicle may employ the present invention. The vehicle 15 includes front and back walls 16 and 17, opposite side walls 18 and 19, a ceiling 20 and a floor 21. A plurality of windows 22 are generally provided along the opposite side walls at viewing heights for seated passengers.

The air conditioning system of the present invention includes generally a wall structure 23 arranged at each of the side walls 18 and 19 and between the lower edges of the windows 22 and the floor 21. The wall structures will extend along the entire lengths of the side walls except in the areas where doors are provided for the ingress and egress of passengers. While the wall structure may be of any desired construction, it generally includes, as shown in FIG. 3, an inside panel 24 coacting with the outer walls to define therebetween an air chamber 25. As seen in FIGS. 6 and 7, the inside panel 24 is double walled as is the outer side wall 19, although both may be single walled if so desired. Insulation may be provided for the outer wall. More specifically, the embodiment of FIG. 8 shows the wall structure wherein the outer side wall 19a and the inside panel 24a are single walled. Where the inner wall is relatively thin like the wall 19a, further radiation thereof adds to passenger comfort. Otherwise, the embodiment of FIG. 8 is substantially identical to the embodiment of FIG. 7 and would operate in the same manner. Quite obviously, the inner and outer panels of the wall structure 23 could be made of any suitable material including an insulating material if so desired. The wall structures 23 coact with a primary air duct 26, which in turn has supplied thereto a source of primary air for induction into the air chambers 25. A plurality of nozzles 27 extend from the ducts 26 upwardly and into the air chambers 25 of the wall structures to deliver the primary air into the air chambers.

The wall structures 23 include a discharge opening 28, in the form of an elongated slot in the illustrated embodiment, and arranged at the upper end of the air chamber 25 to discharge air from the air chamber upwardly along the windows 22 and toward the ceiling 20 in a manner shown by the arrows in FIG. 3. A recirculating air opening 29, also in the form of an elongated slot in the illustrated embodiment, is positioned at the lower end of the wall structure 23 adjacent the floor 21 to permit recirculation of air within the vehicle and air within the vehicle to be drawn into the air chamber 25 and mixed with the primary air delivered from the nozzles 27 and thereafter exited through the discharge opening 28. The primary air being discharged through the nozzles 27 induces the movement of air within the vehicle and the movement of air as recirculating air to enter the recirculating air openings 29 and to thereafter be mixed with the primary air for discharge back into the vehicle. While the discharge opening 28 and the recirculating air opening 29 of each wall structure is shown to be in the form of a slot or elongated opening, it should be appreciated that it may take any desired form. The nozzles 27 are spaced along the ducts 26 and extend upwardly into the lower end of the air chambers 25 to discharge the primary air at a velocity sufficient to induce movement of recirculating air within the vehicle. The sizes of the discharge and recirculating air openings, the size of the air chamber 25, and the nozzle construction and velocity of the primary air emitted therefrom is such as to achieve an induction ratio of primary air to recirculating air of about one to one. Moreover, the spacing of the nozzles along the primary air ducts is such as to provide a balanced and uniform distribution of air throughout the vehicle, and to minimize, if not completely eliminate, any noticeable drafts or "hot" or "cold" spots. The velocity of the air to be exited through the discharge opening is such that it will move the air to the ceiling of the vehicle before it is diffused or dispersed inwardly toward the center of the car after which it can then travel to the floor by gravitational movement and by the induction action of the nozzles. The recirculating air openings 29 of the wall structures are of such size as to enable the velocity moving therethrough to be such that drafts will not be noticeable along the floor 21 and that dirt and other debris from the floor will not be induced to move into the openings. It has been found that if this velocity is not more than fifty feet per minute, it is satisfactory. As shown in FIG. 5, a single elongated nozzle 27A may be employed in place of a plurality of nozzles.

The upstanding deflectors 30, FIG. 4, at the recirculating air opening 29 are primarily non-functional, although some directional air movement may result. It should be appreciated that the deflectors need not be provided. Further, a floor segment 21a is inclined at the recirculating air openings to allow any dirt falling through the air chamber to be deflected outwardly of the openings. However, the floor may be completely horizontal if so desired.

Referring particularly to FIG. 6, panels 31 and 32 of the wall structure 24 define a venturi 33 at the discharge end of the nozzles 27 to further control the discharge of air from the nozzles and the mixing action of the primary and recirculating air. However, it should be appreciated that the venturi 33 need not be provided as shown in the embodiment of FIG. 7 and that the proper induction ratio can still be obtained and the proper mixing and movement of air through the air chamber 25 will still be accomplished. It may also be noticed that the discharge opening 28 in the embodiment of FIG. 6 is shown to be slightly curvate to direct the air discharge from the air chamber 25 upwardly and outwardly toward the windows 22, and this opening may be straight as shown in the embodiment of FIG. 7 and designated by the numeral 28A, wherein the air is directed straight upwardly along the windows 22.

While the nozzles 27 in FIGS. 6 and 7 are shown as fixed nozzles, wherein the velocity would remain the same only if the velocity of the primary air delivered to the ducts 26 remained the same, another feature of the invention involves the provision of a constant velocity nozzle, generally designated by the numeral 34 in FIGS. 12 and 13. The nozzle 34 includes temperature responsive bimetallic side walls 35 that attain the shape shown in solid lines in FIG. 13 within a certain temperature range and then gradually close and finally attain the shape shown in dotted lines upon an increase in temperature of a predetermined amount. When the air conditioning system is on the cooling cycle, the primary air emitted from the nozzles would be such as to maintain the side walls in their outward positions as shown in solid lines, and the primary air would have a relatively high velocity since a person can stand more air movement at the higher temperatures wherein the temperature within the vehicle would be maintained at about 75° F. When the air conditioning system is on the heating cycle and the temperature within the vehicle is maintained at a lower temperature of 65 to 68° F., the primary air would be automatically reduced and in order to provide the proper air induction ratio of primary air to recirculating air, the nozzle 34 would somewhat collapse and thereby increase the velocity therethrough to attain the same induction air ratio. Whether the air conditioning system is on the heat cycle or the cooling cycle, it will be appreciated that the primary air is tempered with the recirculated air and the air exited from the discharge openings of the wall structure would be lower than the primary air if on the heating cycle and higher than the primary air if on the cooling cycle.

While any suitable means may be provided to create the primary air, in order to do so in the present invention a single centrally arranged box or housing or primary air generating unit 36 is arranged below the floor of the vehicle and for the purpose of housing a heating element 37, a cooling element 38, a refrigerant reheat element 39, a blower 40, filters, dampers, thermostats, contactors, relays, and any other necessary element useful for operation of the system. Some of the latter elements are not shown on the drawings since they would be relatively small. It is intended that the central box 36 is used for conditioning and controlling the air within the vehicle.

At the discharge end of the central box 36, a single duct 41 receives the primary air and thereafter distributes same into laterally extending ducts 42 and 43. The laterally extending ducts 42 and 43 intercommunicate the outlet duct 41 with the primary air ducts 26 extending along the opposite sides of the vehicle below the floor. As noted particularly in FIGS. 1, 2 and 9, the ducts 26 and 27 extend the full length of the vehicle beneath the floor 21 and the ducts are tapered to provide uniform distribution of air pressure therealong.

The inlet air to the central box 36 is derived from fresh air outside of the vehicle and return air from within the vehicle, wherein a return air duct 44 and a fresh air duct 45 dump together into the inlet end of the central box 36. A fresh air damper 46 is provided in the fresh air duct just ahead of the inlet end of the central box 36 to control the amount of fresh air allowed to enter into the central box and mix with the fresh air. The return air duct 44 interconnects with laterally extending ducts 47 which go to opposite sides of the vehicle and are connected to return air openings 48 located within the vehicle. Any suitable number of return air openings 48 may be provided to obtain the proper balance of return air to the system. The fresh air duct 45 interconnects with laterally extending ducts 49 that are in turn in communication with fresh air inlets 50 arranged at opposite sides of the vehicle. Any suitable number of fresh air inlets may be provided. While the fresh air inlets 50 are shown in FIG. 1 to be at opposite sides of the vehicle 15 and adjacent the lower edges of the side walls, it should be appreciated that they may be positioned along the upper edges of the side walls, in the roof structure, or at the front or back walls of the vehicle at a high or low position. The amount of fresh air may be cut down at any time by the damper 46, and especially where it is not desirable to bring in the "hot" or "cold" ambient air that would upset the air conditioning system.

In order to provide greater comfort to the passengers at both sides of the vehicle, and where the vehicle may be subjected on one side to a greater ambient temperature such as when subjecting the side to the sun's radiant energy, a directional damper 51, FIGS. 9 and 10, moves to deflect a greater portion of the primary air being discharged from the central box 36 toward the side of the vehicle being subjected to the unusual temperature. For example, when the cooling cycle is on and one side of the vehicle is subjected to the sun's radiant energy, an operator 52 controls the movement of the directional damper 51 is response to a detector 53 to direct a greater portion of the primary air to the duct 26 along the side of the vehicle being subjected to the sun's radiant energy. The detector 53 includes suitable thermostatic elements that are sensitive to the sun's rays as well as the air temperature and this detector may include a pair of units as shown in FIG. 1 arranged at opposite sides of the vehicle and capable of sending a signal to the operator 52 for moving the directional damper where desired. Quite obviously, when the damper 51 is in the middle, the primary air discharged from the central box 36 will be divided equally between the laterally extending ducts 42 and 43 and the primary air ducts 26 at each side of the car. The directional damper may provide any given modulated amount of additional circulating air on the sunny side during cooling and on the shady side during heating.

Referring now to the embodiment of FIG. 14, an alternative air conditioning unit is illustrated which would be substituted for the air conditioning unit to be arranged below the floor of a vehicle for generating primary air to be distributed within the vehicle. This unit includes first and second air conditioning units 70 and 71 for creating primary air and directing it into a distributing plenum chamber 72 that in turn is deflected into laterally extending ducts 42 and 43 that feed the primary air ducts 26 by means of a deflecting member 73. The air conditioning unit 70 includes an inlet 74 connected to a fresh air duct 75 and a recirculating air duct 76, and an outlet 77 that communicates with the distributing plenum chamber 72. A damper 75a is arranged in the fresh air duct 75 to control the fresh air supply. A blower 78 draws the air from the fresh air and recirculating air ducts and drives same across a heating element 79, a cooling element 80, and a refrigerant reheat element 81 and to the outlet 77. Similarly, the air conditioning unit 71 includes an inlet 82 connected to a fresh air duct 83 and a recirculating air duct 84, and an outlet 85 communicating with the distributing plenum chamber 72. A fresh air damper 83a is arranged in the fresh air duct 83 to control the fresh air input to the unit. Within the unit 71, means is provided for conditioning the air including a blower 86, a heating element 87, a cooling element 88, and a refrigerant reheat element 89.

The deflecting unit 73 in the distributing plenum chamber 72 is movable between positions indicated by 73a and 73b in response to the actuator or operator 52 that is operated by the detectors 53 to increase or decrease the amount of circulated air to either side of the vehicle depending upon the ambient conditions as created on either side of the vehicle by the sun. During the heat cycle, the deflector unit will move to direct more circulating air to the shady side of the vehicle, while during the cooling cycle the deflector unit will move to direct more air toward the sunny side. The deflecting unit 73 while situated in the center in solid lines equally distributes the outputs of the air conditioning units 70 and 71 to opposite sides of the car. It should be further appreciated that if one of the air conditioning units malfunctions, some primary air would be generated by one of the units to at least give some conditioned air to the interior of the vehicle.

A further modified air conditioning unit is shown in FIGS. 15 and 16 and generally identified by the numeral 90. This unit includes a central plenum chamber 91 having a recirculating air duct 92 and a fresh air duct 93 intercommunicating therewith and dividing to be received by primary air generating air units 94 and 95. A fresh air damper 93a is arranged within the fresh air duct 93 for controlling fresh air input. The primary air generating unit 94 includes a filter 94a, a cooling unit 94b, a heating unit 94c, and a blower 94d. Similarly, the primary air generating unit 95 includes a filter 95a, a cooling unit 95b, a heating unit 95c, and a blower 95d. The blower 94d is provided with an inlet 96 and an outlet 97, while the blower 95d includes an inlet 98 and an outlet 99. The outlet 97 of the blower 94d comunicates with a laterally extending duct 100 that leads to the primary air duct at one side of the car, while the outlet 99 of the blower 95d communicates with a laterally extending duct 101 that leads to the primary air duct at the other side of the vehicle. An interconnecting duct 102 extends between the laterally extending ducts 100 and 101 and coacts with deflection dampers 103 and 104 that are actuated by the operator 52 in response to the detectors 53 in a manner similar to the deflecting unit 73 of the embodiment shown in FIG. 14 and the directional damper 51 of the embodiment shown in FIG. 9 for directing a portion of the primary air discharged from one blower to the duct at the opposite side of the car. The deflection dampers 103 and 104 move into the air stream from the outlets of the blowers 94d and 95d and are capable of deflecting up to any given amount of air to the opposite side of the car to compensate for sun loads.

Figure 18:
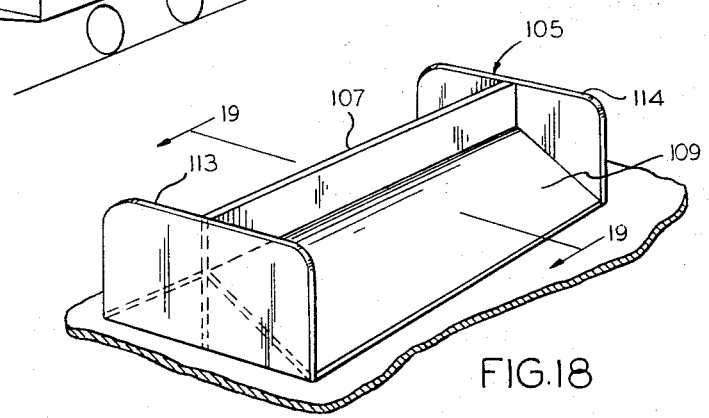
FIG. 18 is an enlarged perspective view of the device to be mounted on a vehicle.
Figure 19:
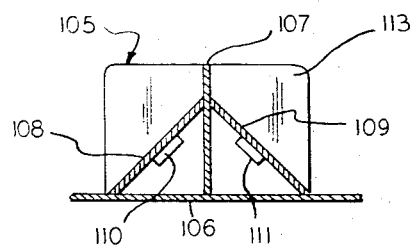
FIG. 19 is a transverse sectional view, taken substantially along line 19—19 of FIG. 18.
Figure 20:
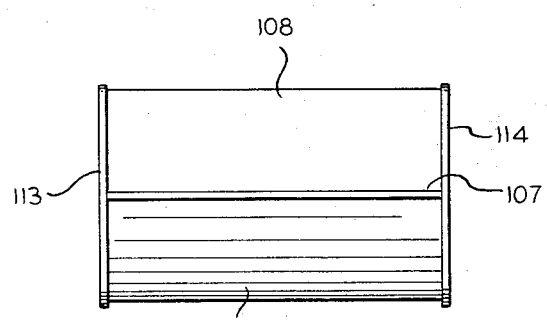
FIG. 20 is a top plan view of the unit shown in FIG. 18.
Figure 21:
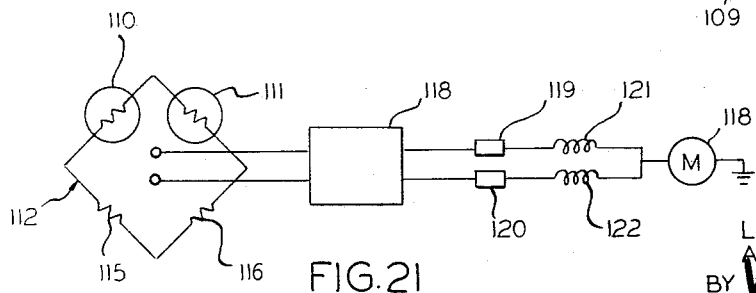
FIG. 21 is a schematic electrical diagram and somewhat in block form of the device shown in FIGS. 17–20.

While any type of detector unit may be employed for controlling side-to-side discharge of primary air depending upon sun loads, another particular form that may be employed is shown in FIGS. 17–21. The detector herein is generally designated by the numeral 105 and defines a unit that may be installed on the roof of a vehicle at about the center thereof at the opposite sides, wherein the roof may be designated in general by the numeral 106. A vertically extending sheet of material 107 capable of defining a thermal barrier is mounted on the roof. Oppositely inclined heat sensing panels 108 and 109 preferably are provided exteriorly with a dull black surface to make them most efficient for absorbing heat. These panels are mounted between the thermal barrier 107 and the roof 106 and engage a point along the thermal barrier short of the upper end thereof so that the upper end portion of the thermal barrier will cast a shadow over one or the other of the panels depending upon the position of the sun relative to the vehicle.

The heat absorbed through the panels 108 and 109 is transferred respectively to thermistors 110 and 111 that are arranged in a bridge circuit 112. In order to minimize the effect of air that may wipe across the surface of the panels 108 and 109, wind shields 113 and 114 are arranged at the opposite ends of the panels as particularly shown in FIGS. 18 and 20.

The bridge circuit 112 includes balancing resistors 115 and 116, together with a variable resistor 117 that is connected to the shaft of the motor or actuator 118 which would control the deflection damper such as the damper 51 in the embodiment of FIG. 9, the dampers 103 and 104 in the embodiment of FIG. 15, or the deflecting unit 73 in the embodiment of FIG. 14. The output of the bridge is received by suitable amplifiers 118 which further serve to operate static switches 119 and 120 for controlling the fields 121 and 122 of the motor 118 to drive it in one direction or the other. The static switches may be in the form of the usual type that flips on or off. Thus, the detector 105 is sensitive to heat for controlling the side-to-side discharge of primary air within the vehicle and compensating for sun loads.

An example of a satisfactory air distribution system embodying the present invention which would insure a feeling of air freshness around the passengers within a standard size vehicle and minimize the temperature differential between delivered conditioned or primary air and vehicle air to eliminate cold drafts would employ an air circulation rate of 6000 cubic feet per minute for a 10-ton cooling capacity. This total air circulation rate is divided into 3000 cubic feet per minute of primary air, that is, air movement over the cooling element and introduced through the ducts 26 and nozzles 27, and 3000 cubic feet per minute of induced air. The induced air is that already in the vehicle which is induced to be mixed with the primary air in the air chamber of the wall structure. This arrangement permits a fifty percent reduction of duct area requirement for a given air circulation rate. Further, the induced air and primary air are mixed in the wall structure and then discharged uniformly along the window sill line at a velocity of about 600 feet per minute. Thus, the air mixture wipes the windows so that the passenger is protected from the radiant effect of warm glass in the summer and cold glass in the winter. Such wiping action further prevents fogging of the windows in cold weather. Moreover, the side wall panel adjacent to the passenger will provide a cooling radiant effect during summertime when the wall is in communication with cool air passing through the air chamber, and a warm radiant effect in the wintertime when the panel is in communication with warmed air in the air chamber, all of which further enhances the comfort of the passengers.

Referring again to the wall structures 23, the induction ratio to be provided by the nozzles 27 as to the primary and recirculating air should be such as to obtain uniform air distribution throughout the interior of the vehicle and to provide proper mixing or blending of the primary air with the recirculated air to eliminate "hot" or "cold" drafts or spots. And the induction system tempers the supply of primary air with recirculating air and also moves the discharged air from the discharge openings 28 throughout the cross section of the vehicle.

It will be understood that modifications and variations may be effected without departing from the scope of the novel concepts of the present invention, but it is understood that this application is to be limited only by the scope of the appended claims.

The invention is hereby claimed as follows:

1. An air conditioning and distribution system for obtaining such uniform distribution of air within a vehicle having a floor, a ceiling, and front, back and side walls, and windows in the side walls at viewing height for a person in seated position that the temperature of the air throughout the vehicle is substantially the same, said system comprising, a wall structure along each of the side walls of the vehicle extending between the floor and the lower edges of the windows, each wall structure defining an elongated air chamber, a discharge opening at the upper end of each wall structure at the lower edges of the windows for discharging air from the upper end of the air chamber into the vehicle upwardly along the windows toward the ceiling, a recirculating air opening at the lower end of each wall structure for permitting air within said vehicle to enter said air chamber at the lower end thereof, a duct extending below the floor along each side of the vehicle for delivering primary air to each air chamber of the wall structures, nozzles extending from each duct and into the air chamber of each wall structure for delivering the primary air into each said chamber and to induce movement of air within the vehicle and through the recirculating air openings to be mixed with the primary air and thereafter discharged through said discharge openings, means for delivering primary air to each duct, said means including a unit for generating and conditioning primary air having an inlet and an outlet, means connecting said outlet with said primary air ducts, air inlets and means for conducting return air from within said vehicle to said generating unit inlet, and air inlets and means for conducting fresh air to said generating unit inlet.

2. An air conditioning and distribution system for obtaining such uniform distribution of air within a vehicle having a floor, a ceiling, and front, back and side walls, and windows in the side walls at viewing height for a person in seated position that the temperature of the air throughout the vehicle is substantially the same, said system comprising, a wall structure along each of the side walls of the vehicle extending between the floor and the lower edges of the windows, each wall structure defining an elongated air chamber, a discharge opening at the upper end of each wall structure at the lower edges of the windows for discharging air from the upper end of the air chamber into the vehicle upwardly along the windows toward the ceiling, a recirculating air opening at the lower end of each wall structure for permitting air within said vehicle to enter said air chamber at the lower end thereof, a duct extending below the floor along each side of the vehicle for delivering primary air to each air chamber of the wall structures, nozzles extending from each duct and into the air chamber of each wall structure for delivering the primary air into each said chamber and to induce movement of air within the vehicle and through the recirculating air openings to be mixed with the primary air and thereafter discharged through said discharge openings, means for delivering primary air to each duct, said means including a unit located below the floor of the vehicle and centrally between the sides thereof for conditioning and distributing primary air, an inlet and an outlet for said unit, means interconnecting said outlet with said primary air ducts, return air inlets opening within said vehicle, fresh air returns opening outside of said vehicle, and means for interconnecting said return and fresh air inlets to said inlet of said unit.

3. An air conditioning and distribution system for obtaining such uniform distribution of air within a vehicle having a floor, a ceiling, and front, back and side walls, and windows in the side walls at viewing height for a person in seated position that the temperature of the air throughout the vehicle is substantially the same, said system comprising, a wall structure along each of the side walls of the vehicle extending between the floor and the lower edges of the windows, each wall structure defining an elongated air chamber, a discharge opening at the upper end of each wall structure at the lower edges of the windows for discharging air from the upper end of the air chamber into the vehicle upwardly along the windows toward the ceiling, a recirculating air opening at the lower end of each wall structure for permitting air within said vehicle to enter said air chamber at the lower end thereof, a duct extending below the floor along each side of the vehicle for delivering primary air to each air chamber of the wall structures, nozzles extending from each duct and into the air chamber of each wall structure for delivering the primary air into each said chamber and to induce movement of air within the vehicle and through the recirculating air openings to be mixed with the primary air and thereafter discharged through said discharge openings, means for delivering primary air to each duct, said means including a unit located below the floor of the vehicle and centrally between the sides thereof for conditioning and distributing primary air, an inlet and an outlet for said unit, primary air ductwork interconnecting said outlet of said unit and said primary air ducts, return air inlets opening within said vehicle, fresh air returns opening outside of said vehicle, and ductwork interconnecting said return and fresh air inlets to the inlet of said unit.

4. The combination as defined in claim 3, and a damper in said fresh air ductwork for controlling the amount of fresh air going to said unit.

5. The combination as defined in claim 3, and means in the primary air ductwork for controlling the distribution of primary air to said primary air ducts to compensate for temperature variation between the opposite sides of the vehicle resulting from solar radiant energy impinging thereon.

6. The combination as defined in claim 3, and means within said unit for heating and cooling the primary air.

7. An air conditioning and distribution system for obtaining such uniform distribution of air within a vehicle having a floor, a ceiling, and front, back and side walls, and windows in the side walls at viewing height for a person in seated position that the temperature of the air throughout said vehicle is substantially the same, said system comprising, a wall structure along each of the side walls of the vehicle extending between the floor and the lower edges of the windows, each wall structure defining an elongated air chamber, a discharge opening at the upper end of each wall structure at the lower edges of the windows for discharging air from the upper end of the air chamber into the vehicle upwardly along the windows toward the ceiling, a recirculating air opening at the lower end of each wall structure for permitting air within said vehicle to enter said air chamber at the lower end thereof, a duct extending below the floor along each side of the vehicle for delivering primary air to each air chamber of the wall structures, nozzles extending from each duct and into the air chamber of each wall structure for delivering the primary air into each said chamber and to induce movement of air within the vehicle and through the recirculating air openings to be mixed with the primary air and thereafter discharged through said discharge openings, means for delivering primary air to each duct, said means including a unit located below the floor of the vehicle and centrally between the sides thereof for generating, conditioning and distributing primary air, an inlet and an outlet for said unit, primary air duct work interconnecting said outlet of said unit and said primary air ducts, return air inlets opening within said vehicle, fresh air returns opening outside of said vehicle, ductwork interconnecting said return and fresh air inlets to the inlet of said generating unit, damper means in the primary air ductwork for controlling the distribution of primary air to said primary air ducts, and a radiant energy responsive means for operating said damper means in response to the ambient climatic conditions.

8. An air distribution system for obtaining such uniform distribution of air within a vehicle having a floor, a ceiling, and front, back and side walls, and windows in the side walls at viewing height for a person in seated position that the temperature of the air throughout the vehicle is substantially the same, said system comprising, a wall structure along each of the side walls of the vehicle extending between the floor and the lower edges of the windows, each wall structure defining an elongated air chamber, a discharge opening at the upper end of each wall structure at the lower edges of the windows for discharging air from the upper end of the air chamber into the vehicle upwardly along the windows toward the ceiling, a recirculating air opening at the lower end of each wall structure for permitting air within said vehicle to enter said air chamber at the lower end thereof, a duct extending below the floor along each side of the vehicle for delivering primary air to each air chamber of the wall structures, nozzles extending from each duct and into the air chamber of each wall structure for delivering the primary air into each said chamber and to induce movement of air within the vehicle and through the recirculating air openings to be mixed with the primary air and thereafter discharged through said discharge openings, each of said nozzles having temperature responsive side walls to vary the discharge opening thereof and control the discharge velocity, and means for delivering primary air to each duct.

9. In a vehicle having an air distribution system for obtaining distribution of air within a vehicle having a floor exposed on the underside to the atmosphere, a ceiling, and front, back and side walls, air discharge openings within said vehicle and along opposite sides thereof, return air openings within said vehicle, a duct extending below the floor and exposed to the atmosphere along each side of the vehicle for delivering primary air to said air discharge openings, means for conditioning and delivering primary air to each duct, said means including a central box monuted below the floor of the vehicle and exposed to the atmosphere having means therein for conditioning air and having an inlet opening and an outlet opening, conduit means connecting the outlet opening to said ducts, fresh air inlets outside of the vehicle, and conduit means connecting the inlet opening to a fresh air inlet and a return air opening.

10. In a vehicle having an air distribution system for obtaining distribution of air within a vehicle having a floor exposed on the underside to the atmosphere, a ceiling, and front, back and side walls, air discharge openings within said vehicle and along opposite sides thereof, return air openings within said vehicle, a duct extending below the floor and exposed to the atmosphere along each side of the vehicle for delivering primary air to said air discharge openings, means for conditioning and delivering primary air to each duct, said means including a box-like housing located below the floor of the vehicle and exposed to the atmosphere and having means therein for conditioning and driving air to each duct, and an air inlet and an air outlet, ductwork interconnecting the air outlet with said ducts, fresh air inlets outside of the vehicle, and ductwork interconnecting said return and fresh air inlets with the air inlet of said housing.

11. In a vehicle having an air distribution system for obtaining distribution of air within a vehicle having a floor, a ceiling, and front, back and side walls, air discharge openings within said vehicle and along opposite sides thereof, return air openings within said vehicle, a duct extending below the floor along each side of the vehicle for delivering primary air to said air discharge openings, means for conditioning and delivering primary air to each duct, said means including a unit located below the floor of the vehicle for conditioning and distributing primary air, an inlet and an outlet for said unit, means interconnecting said outlet with said primary air ducts, means for normally deflecting the air at said outlet into said primary air ducts in equal amounts, and means for detecting the sun load at opposite sides of the vehicle and thereby controlling said deflecting means for varying the side to side air discharge into the primary air ducts and said air discharge openings according to need.

12. In a vehicle having an air distribution system for obtaining distribution of air within a vehicle having a floor, a ceiling, and front, back and side walls, air discharge openings within said vehicle and along opposite sides thereof, return air openings within said vehicle, a duct extending below the floor along each side of the vehicle for delivering primary air to said air discharge openings, means for conditioning and delivering primary air to each duct, said means including a unit located below the floor of the vehicle for conditioning and distributing primary air, an inlet and an outlet for said unit, means interconnecting said outlet with said primary air ducts, movable deflector means at said outlet and said primary air ducts interconnecting means for normally equally dividing the primary air between said primary air ducts, and means mounted on the outside of said vehicle for detecting the sun loads at opposite sides of the vehicle and operating said deflector means to deflect a greater portion of the primary air to one of the primary air ducts to compensate for the sun load differential.

13. In a vehicle having an air distribution system for obtaining distribution of air within a vehicle having a floor, a ceiling, and front, back and side walls, air discharge openings within said vehicle and along opposite sides thereof, return air openings within said vehicle, a duct extending below the floor along each side of the vehicle for delivering primary air to said air discharge openings, means for conditioning and delivering primary air to each duct, said means including a unit located below the floor of the vehicle for conditioning and distributing primary air, said unit including first and second primary air generators, said generators having inlets and outlets, a distribution plenum interconnecting said outlets and said primary air ducts, deflector means in said plenum for normally distributing the air from said outlet equally between said primary air ducts, and detecting means mounted on the outside of said vehicle for detecting the sun loads at opposite sides of the vehicle to control said deflector means and shift a greater air discharge from said outlets to one of said primary air ducts.

14. In a vehicle having an air distribution system for obtaining distribution of air within a vehicle having a floor, a ceiling, and front, back and side walls, air discharge openings within said vehicle and along opposite sides thereof, return air openings within said vehicle, a duct extending below the floor along each side of the vehicle for delivering primary air to said air discharge openings, means for conditioning and delivering primary air to each duct, said means including a unit located below the floor of the vehicle for conditioning and distributing primary air, said unit including first and second primary air generators, said generators having inlets and outlets, a distribution plenum interconnecting said outlets and said primary air ducts, deflector means in said plenum for normally distributing the air from said outlet equally between said primary air ducts, detecting means mounted on the outside of said vehicle for detecting the sun loads at opposite sides of the vehicle to control said deflector means and shift a greater air discharge from said outlets to one of said primary air ducts, and return air inlets within said vehicle interconnected with said inlets to said generators, and fresh air inlets interconnected with said generator inlets.

15. In a vehicle having an air distribution system for obtaining distribution of air within a vehicle having a floor, a ceiling, and front, back and side walls, air discharge openings within said vehicle and along opposite sides thereof, return air openings within said vehicle, a duct extending below the floor along each side of the vehicle for delivering primary air to said air discharge openings, means for conditioning and delivering primary air to each duct, said means including a unit located below the floor of the vehicle for conditioning and distributing primary air, said unit including first and second primary air generators, said generators having inlets and outlets, the outlet of one generator being connected to one of said primary air ducts, the outlet of the other generator being connected to the other of said primary air ducts, an interconnecting crossover duct between said primary air ducts, deflector means at each end of said crossover duct for moving to positions to deflect at least a portion of the output of one generator into the primary air duct of the other generator, and detecting means mounted on the outside of said vehicle for detecting the sun loads at opposite sides of the vehicle to control said deflector means and shift a greater air discharge from one of said generators to the primary air duct of the other generator.

References Cited

UNITED STATES PATENTS

| | | | |
|---|---|---|---|
| 1,296,968 | 3/1919 | Klein | 98—33 |
| 1,303,210 | 5/1919 | Klein | 98—33 |
| 1,832,638 | 11/1931 | Kitchen | 98—33 |
| 3,012,759 | 12/1961 | Klarer | 165—123 X |
| 3,194,307 | 7/1965 | Wood | 165—123 |
| 3,217,788 | 11/1965 | Adam | 165—123 X |

MEYER PERLIN, *Primary Examiner.*